Figure 4:
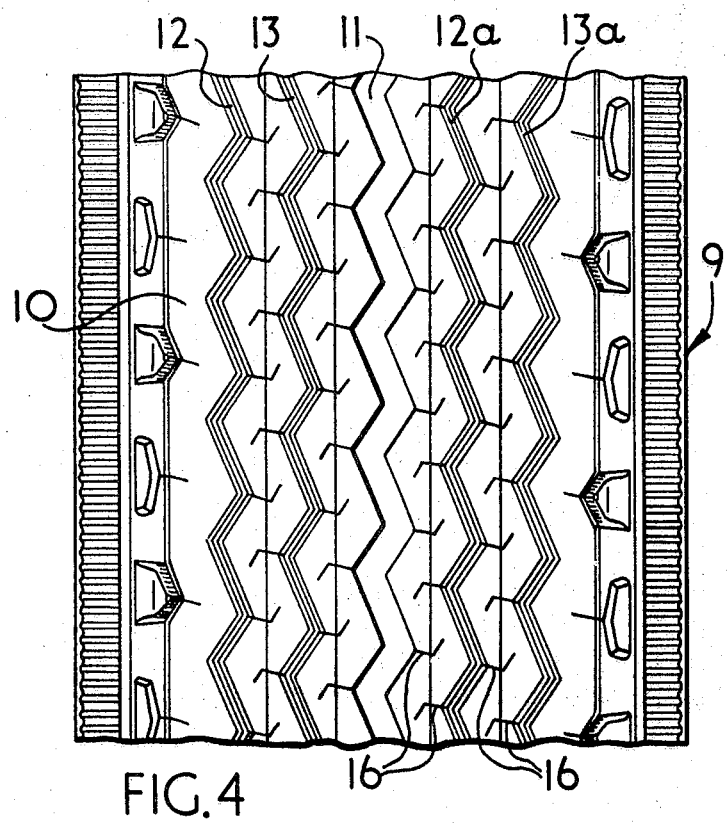

United States Patent

[11] 3,570,571

| [72] | Inventor | John Michael Riches<br>Castle Bromwich, near Birmingham, England |
|---|---|---|
| [21] | Appl. No. | 658,849 |
| [22] | Filed | Aug. 7, 1967 |
| [45] | Patented | Mar. 16, 1971 |
| [73] | Assignee | The Dunlop Company Limited<br>London County, England |
| [32] | Priority | Aug. 6, 1966 |
| [33] | | Great Britain |
| [31] | | 35300/66 |

[54] TIRES
11 Claims, 5 Drawing Figs.

[52] U.S. Cl. ................................................ 152/209
[51] Int. Cl. ................................................ B60c 11/06
[50] Field of Search ........................................ 152/209, 209 (D), 209 (S)

[56] References Cited
UNITED STATES PATENTS

| 2,104,532 | 1/1938 | Sommer | 152/209 |
| 2,696,863 | 12/1954 | Ewart et al. | 152/209 |
| 3,012,599 | 12/1961 | Benson et al. | 152/209 |
| 3,384,144 | 5/1968 | Tiborcz | 152/209 |

Primary Examiner—Arthur L. La Point
Assistant Examiner—Charles B. Lyon
Attorney—March, Lefever, Wyatt & Lazar ABSTRACT: A pneumatic tire tread having both circumferentially and transversely extending slots formed in one or more circumferentially extending ribs. The slots are substantially smaller than the groove or grooves between ribs and are between 0.75 mm. and 2.0 mm. wide at the ground-contacting surface when the tire is inflated. The transversely extending slots may be provided with drainage channels which are wider than the slots, of which the following is a specification.

Patented March 16, 1971
3,570,571
2 Sheets-Sheet 1
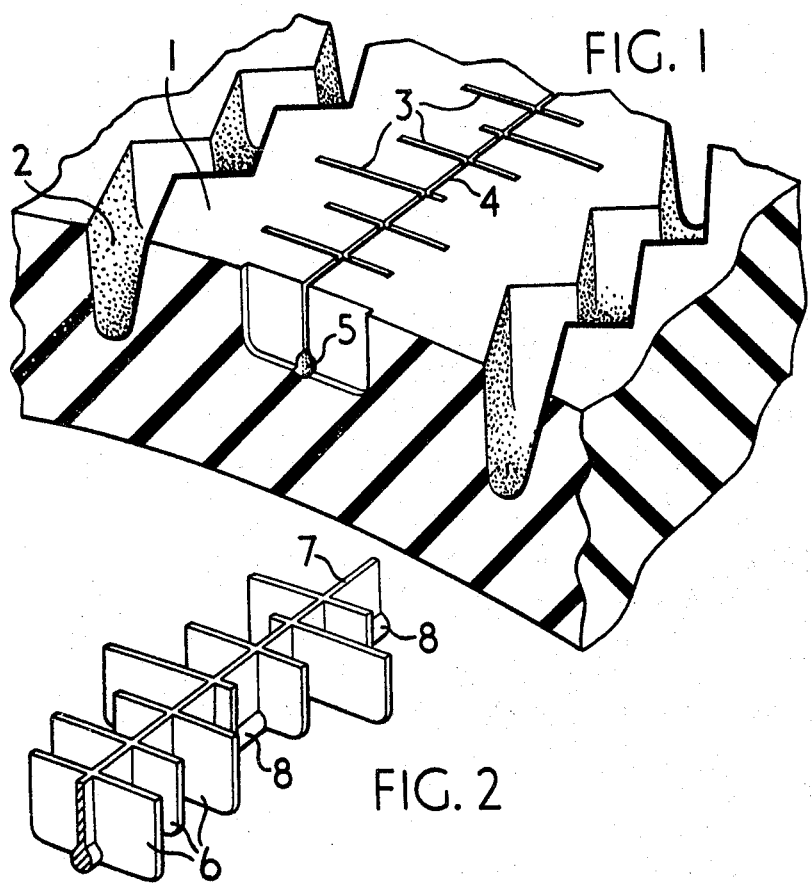
FIG. 1
FIG. 2
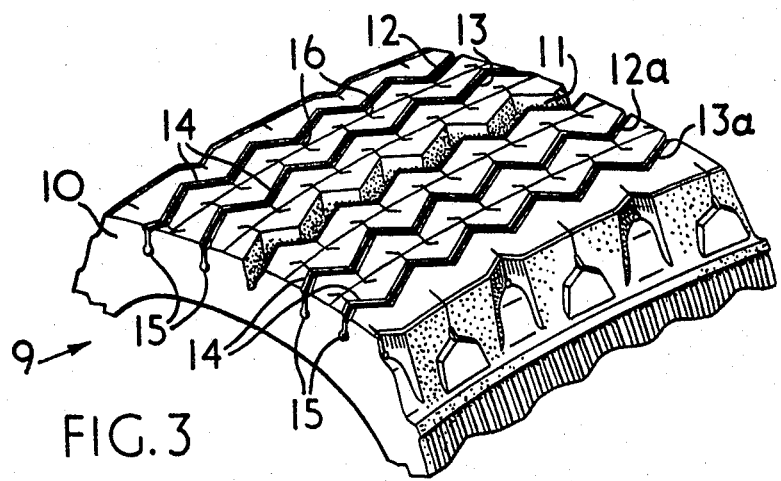
FIG. 3
John Michael Riches
Inventor
By Rauber & Lazar
Attorneys

TIRES

This invention relates to a pneumatic tire and also to a moulding apparatus for forming at least the tread portion of the tire.

According to the invention there is provided a pneumatic tire having a tread portion comprising at least one generally circumferential rib and a generally circumferential groove on at least one side of the rib, the rib having a plurality of circumferentially-spaced-apart transversely-extending slots and at least one generally circumferential slot formed therein, the generally circumferential slot intersecting some at least of said transversely-extending slots and the width of the generally circumferential slot in the fully inflated and undistorted shape at the ground-contacting surface of the rib being substantially smaller than the width of the groove and measuring from 0.75 mm. to 2.0 mm. measured in the undistorted and fully inflated state of the tire.

The term "generally circumferential" as used in the preceding paragraph and throughout the remainder of the specification and claims means parallel to or at an angle of not greater than 45° to a circumferential line of the tire. It includes "zigzag" and diagonal configurations. The term "transversely-extending slots" as used in the preceding paragraph and throughout the remainder of the specification and claims means slots extending in a direction at any angle but not parallel to a circumferential line of the tire. It includes rectilinear configurations and also curved, wavy and "zigzag" configurations when the general direction is to be taken as the direction in which the slots extend.

The or each generally circumferential slot is preferably formed with a radially-inwardly-located channel portion of a larger transverse cross-sectional area than that of the said slot at the ground-contacting surface of the rib, said channel portion having an approximately oval or circular cross section and preferably comprising the radially-innermost portion of the slot. Part at least of said radially-innermost portion can lie radially inwardly or outwardly of the radially-innermost extremities of the transversely-extending slots which said generally circumferential slot intersects.

By generally circumferential slot is meant an endless truly circumferential slot.

The tread portion of the tire may comprise a plurality of said ribs, those ribs which are located axially inwardly of the axially-outermost ribs having a generally circumferential groove at each side thereof. In this construction the inclined circumferential slots may extend, in those ribs which are located axially inwardly of the axially-outermost ribs, at each of their ends, to the circumferential grooves whilst in the axially-outermost ribs, such inclined circumferential slots may extend from a circumferential groove to the shoulder of the tire.

Also in accordance with the invention there is provided moulding apparatus for moulding at least the tread portion of a pneumatic tire comprising a generally annular tread-moulding matrix having, on its radially-inner surface, at least one generally circumferential flange for moulding a groove in the said tread portion and at least one circumferential groove for moulding a rib in the tread portion, a plurality of circumferentially-spaced-apart transversely-extending blades for extending radially inwardly of the base of the groove for moulding corresponding transversely-extending slots in the tread rib the width of the slots being substantially smaller than the width of the said groove and one or more generally circumferential blades extending radially inwardly of said base for moulding a corresponding slot or slots in the tread rib, the or each of which circumferential blades intersects some at least of said transversely-extending blades.

Preferably each generally circumferentially-extending blade is provided with a widened portion preferably located adjacent to its radially innermost edge, the said widened portion of the blade being substantially oval or circular in cross section corresponding to the cross section of the channel portion which may be provided in the generally circumferential slots in the moulded tire tread.

Figure 5:
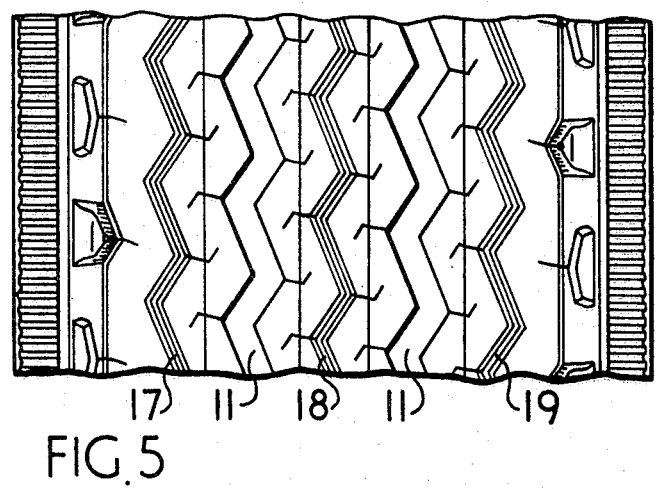

Embodiments of pneumatic tires and moulding apparatus for the manufacture of same will now be described in more detail by way of example and with reference to the accompanying drawings in which:

FIG. 1 is a part perspective part sectional view of part of a tire tread according to the invention, FIG. 2 is a perspective view of part of the mould used to form the tire tread shown in FIG. 1, FIGS. 3 and 4 illustrate, respectively, a fragmentary perspective view and a fragmentary plan view of a truck tire manufactured in accordance with the invention, and FIG. 5 is a fragmentary plan view of a design alternative to that illustrated in FIGS. 3 and 4.

In a first construction there is provided a pneumatic truck tire of conventional radial-ply carcass construction having one or more breaker layers and a tread portion provided with a plurality of generally circumferentially-extending ribs having ground-contacting surfaces, a generally circumferentially-extending groove, of approximately 12 mm. width measured at the ground-contacting surface, being formed at each side of each rib with the exception of the axially-outermost ribs, the axially-outer edges of which extend substantially radially inwardly into the shoulder regions of the tire.

Each rib 1 (see FIG. 1) between two circumferentially-extending grooves 2 is provided with a plurality of circumferentially-spaced-apart slots 3 of rectangular transverse cross-sectional form, each slot being linear and extending transversely across the rib substantially normal to the midcircumferential plane of the tire. The slots are deliberately not equally spaced-apart so as to avoid an unwanted monotonic note which might arise during running if the spacings were equal. There is also provided in each rib, in accordance with the invention, an endless linear circumferentially-extending slot 4 lying parallel to the midcircumferential plane of the tire and having its radially-innermost extremity in the form of a channel 5 of circular transverse cross-sectional form 3 mm. diameter compared with the rectangular transverse cross-sectional form of the remaining radially-extending portion of the circumferential slot. The width of the circumferential slot, approximately 1.00 mm., at the ground-contacting surface of the rib is substantially equal to that of each one of the transversely-extending slots at said surface. By contrast the width of the groove 2, measured at the same surface, is 12 mm. The radially-innermost part of the circular cross-sectional channel portion of the circumferential slot lies lightly radially inwardly of the radially-innermost extremities of the transversely-extending slots and both the rectangular and circular cross-sectional parts of the circumferential slot intersects all of the transversely-extending slots formed in the rib. The major part of the channel portion of the circumferential slot lies radially outwardly of the radially-innermost extremities of the transversely-extending slots.

The tread portion of such a tire is produced by the use of a mould comprising a generally annular moulding matrix split about its midcircumferential line to permit insertion and removal of the tire from the mould. The radially-inner surface of the moulding matrix is formed with a plurality of axially-spaced-apart generally circumferential grooves for moulding the ribs of the tire. A plurality of blades 6 (see FIG. 2) of rectangular cross-sectional form project radially inwardly from the base of each groove and extend linearly transversely across each groove substantially normal to the midcircumferential plane of the matrix for moulding the aforementioned transversely-extending slots in the tread portion rib of the tire.

An endless circumferentially-extending blade portion 7 projects radially inwardly of the matrix from the base of each groove to intersect all of the transverse blades and the radially-inner portion of the circumferential blade is formed with an enlarged head portion 8 of circular cross-sectional form, a radially-outer part of which intersects the transverse blades at their radially-innermost extremities whilst the major part of the circumferentially-extending head portion is located radially inwardly of said radially-innermost extremities of the transverse blades. This circumferentially-extending blade and head portion is utilized to mould the aforesaid circumferential slot and enlarged radially-inner channel in the tread portion of the tire. The width of the circumferential blade at the base of the groove is substantially equal to that of each one of the transverse blades at said base of the groove.

The tire illustrated in FIGS. 3 and 4 of the drawings will now be particularly described.

The tire 9 has a tread pattern 10 incorporating a generally circumferential zigzag groove 11 having a width of 12 mm. measured at the ground-contacting surface and is tapered from that surface towards the base as will be seen from FIG. 3. The groove 11 is located about the midcircumferential plane of the tread and on each side of this groove there are disposed a pair of parallel zigzag slots 12, 13, 12a and 13a. These slots have a width adjacent to the ground-contacting surface of 1 mm., the slot being flared towards the ground-contacting surface at the mouth 14 to increase the width. At the base of the slots 12, 13, 12a and 13a there is provided a channel 15 (see FIG. 3) of circular transverse cross section and of diameter 6 mm. The tread is divided up into ribs of substantially equal width by the slots 12, 13, 12a and 13a of the groove 11.

Both the groove 11 and slots 12, 13, 12a and 13a are provided with a plurality of transversely-extending slots 16 which are of substantially L-shape in plan view (see FIG. 4) which lead into the slots or grooves and which have a width, measured adjacent to the ground-contacting surface, the same as that of the slots 12, 13, 12a and 13a the combination of grooves and slots operating in the same way as is described in connection with the embodiments illustrated in FIG. 1.

The embodiment shown in FIG. 5 also illustrates a truck tire and corresponds, dimensionally, and in other detail, with the embodiment illustrated in and described with reference to FIGS. 3 and 4, the difference being that whereas a single groove 11 is provided with width 12 mm. in the construction of FIGS. 3 and 4, in FIG. 5 two such grooves 11 are provided, the remaining three slots 17, 18 and 19 being dimensionally the same as the slots 12, 13, 12a and 13a of the construction shown in FIGS. 3 and 4.

In an alternative construction (not shown) the tread portion of a pneumatic tire is again provided with a plurality of generally circumferential ribs and grooves, each rib having a plurality of transversely-extending slots formed therein. However, in this construction, a plurality of circumferentially-spaced generally circumferential slots are provided in each rib of the tread portion, each slot being inclined at an angle of 20° to the midcircumferential plane of the tire and opening at each of its ends into the grooves which are formed one at each side of those ribs located axially inwardly of the axially-outermost ribs. Each such generally circumferential slot is formed with an enlarged radially-innermost portion comprising a circular transverse cross-sectional form channel, these enlarged channel portions also extending to those grooves adjacent to the rib. In this construction each generally circumferential slot intersects a plurality of the transversely-extending slots, the number of slots being intersected depending upon the circumferential spacing and length of the slots. Again the width of each one of the generally circumferential slots at the ground-contacting surface of the rib is substantially equal to that of each one of the transversely-extending slots at said surface.

Such an alternative tread portion formation is produced by similar moulding apparatus to that described above with the exception that a plurality of generally circumferential blades project radially inwardly from the base of each groove to mould the aforesaid generally circumferential slots in the tread portion. The width of each one of the generally circumferential blades at the base of the groove is substantially equal to that of each one of the transverse blades at said base.

In this alternative construction the axially-outermost ribs of the tire are formed with a plurality of generally circumferential slots therein, which are inclined at an angle of 20° to the midcircumferential plane of the tire, but in the case of these ribs one end of each slot extends into the groove adjacent the axially-innermost side of the rib whilst the other end of the slot extends into the shoulder region of the tire.

Also the circumferential slots in any of these constructions may be formed within any one or all of the generally circumferential ribs of the tire tread portion. The transversely-extending slots as well as being linear may be zigzag, curved or wavy, viewed either from outside the tread or inside elevation i.e. when looking along the tire axes in plan view. In addition the transverse cross-sectional form of both the transverse and circumferential slots is not critical and the radially-innermost channel portion of the circumferential slots which is of enlarged transverse cross-sectional form may be of some other form than circular such as oval.

A typical dimensional arrangement of the tread portion of a truck tire constructed in accordance with the invention is that the radially-innermost surface of the enlarged channel portion of the circumferential slots lies between 1 mm., and 8½mm., radially outwardly of the radially-outermost breaker layer of the tire, a typical distance being 6 mm. Where the transverse cross-sectional form of the enlarged channel portion of the circumferential slots is circular its diameter may lie between 1½ and 7 mm., a typical diameter being 3 mm., and when said cross-sectional form is oval its major diameter may be 5 mm., and its minor diameter may be 3 mm. The width of the circumferential slots may or may not be equal to the width of the transversely-extending slots but both widths lie within the range 0.75 mm. to 2.0 mm. at the ground-contacting surface of the tire. In truck tires the generally circumferential groove may have a width of up to 12 mm., measured at the ground-contacting surface but, for example, in a car tire, the width may be about 6 mm.

A tire constructed in accordance with the present invention has been found to give an increased wet-cornering force compared with a similar tire which is not provided with the circumferential slots in each rib of the tread portion in addition to the transverse slots. During rolling movement of the tire upon a water-saturated surface the majority of the water is deflected directly into the circumferential grooves and is thrown clear by the centrifugal action of the rotating tire. After this preliminary water removal stage, a thin film of water still remains in the contact area of the distorted tire on the ground and to obtain good frictional engagement with the ground it is necessary to remove this thin film of water also. The transversely-extending slots, which have hitherto been provided in the circumferential ribs, have absorbed some of this film of water but the pressure of the air trapped in the radially-inner parts of such transversely-extending slots has prevented the full depth of these slots being utilized for water removal. The provision of the generally circumferential slots which intersect some, at least, of the transversely-extending slots in each rib allows a greater depth of each transversely-extending slot to be utilized for water absorption since the air, which was hitherto trapped in the transversely-extending slots can escape along the circumferential slots.

This means of air release from the transversely-extending slots is, of course, effective even if no enlarged radially-inner channel portion is formed in the circumferential slots; however, the provision of the radially-inner channel portion of the circumferential slots of enlarged transverse cross-sectional form gives extra water absorption capacity as well as offering less resistance to the air which is displaced by the absorbed water. Such an enlarged radially-inner channel portion of the circumferential slots also permits a freer movement of the water within the slots when they are full of water.

Furthermore, the effect of both the transversely-extending and circumferential slots is maintained substantially throughout the life of the tire culminating after sufficient wear has taken place, in the emergence of the enlarged radially-inner channel portion of the circumferential slots thereby revealing an additional tread pattern feature which will also assist in the bulk removal of water on a wet surface. It has also been found that the circumferential slots resist entry of stones with a resulting reduction in stone damage to the tire.

I claim:

1. A pneumatic tire having a tread portion comprising at least one generally circumferential rib and a generally circumferential drainage groove on at least one side of the rib, the rib having a plurality of circumferentially spaced apart transversely extending slots and at least one generally circumferential slot formed therein, the generally circumferential slot intersecting some at least of said transversely extending slots and extending for a sufficient proportion of the circumference of the tire so as always to communicate with atmosphere in the normally inflated and loaded state of the tire so as to allow escape of air from the slots, the width of the generally circumferential slot in the fully inflated and undistorted shape at the ground-contacting surface of the rib being substantially smaller than the width of the groove and measuring from 0.75 mm. to 2.0 mm. measured in the undistorted and fully inflated state of the tire.

2. A pneumatic tire according to claim 1 wherein said generally circumferential slot is endless, extending completely around the tire circumference.

3. A pneumatic tire according to claim 1 wherein the depth of the transversely-extending slots is substantially equal to the or each circumferentially extending slot.

4. A pneumatic tire according to claim 1 wherein the transversely-extending slot is linear.

5. A pneumatic tire according to claim 1 wherein the transversely-extending slot is curved.

6. A pneumatic tire according to claim 1 wherein the transversely-extending slot connects with the groove or with the tire shoulder.

7. A pneumatic tire according to claim 1 wherein the or each generally circumferentially-extending slot is formed with a radially-inwardly located channel of larger transverse cross-sectional area than that of the said slot at the ground-contacting surface of the rib.

8. A pneumatic tire according to claim 7 wherein the said channel comprises the radially-innermost portion of the slot.

9. A pneumatic tire according to claim 7 wherein said channel is substantially oval in cross section 10. A pneumatic tire according to claim 7 wherein the said channel has a substantially circular cross section.

11. A pneumatic tire according to claim 10 wherein the diameter of said channel lies in the range from 1.5 mm. to 7.0 mm.